July 8, 1941. F. ALLENDORFF 2,248,653
APPARATUS FOR MEASURING THE AMPLITUDE OF OSCILLATIONS
Filed Jan. 27, 1939
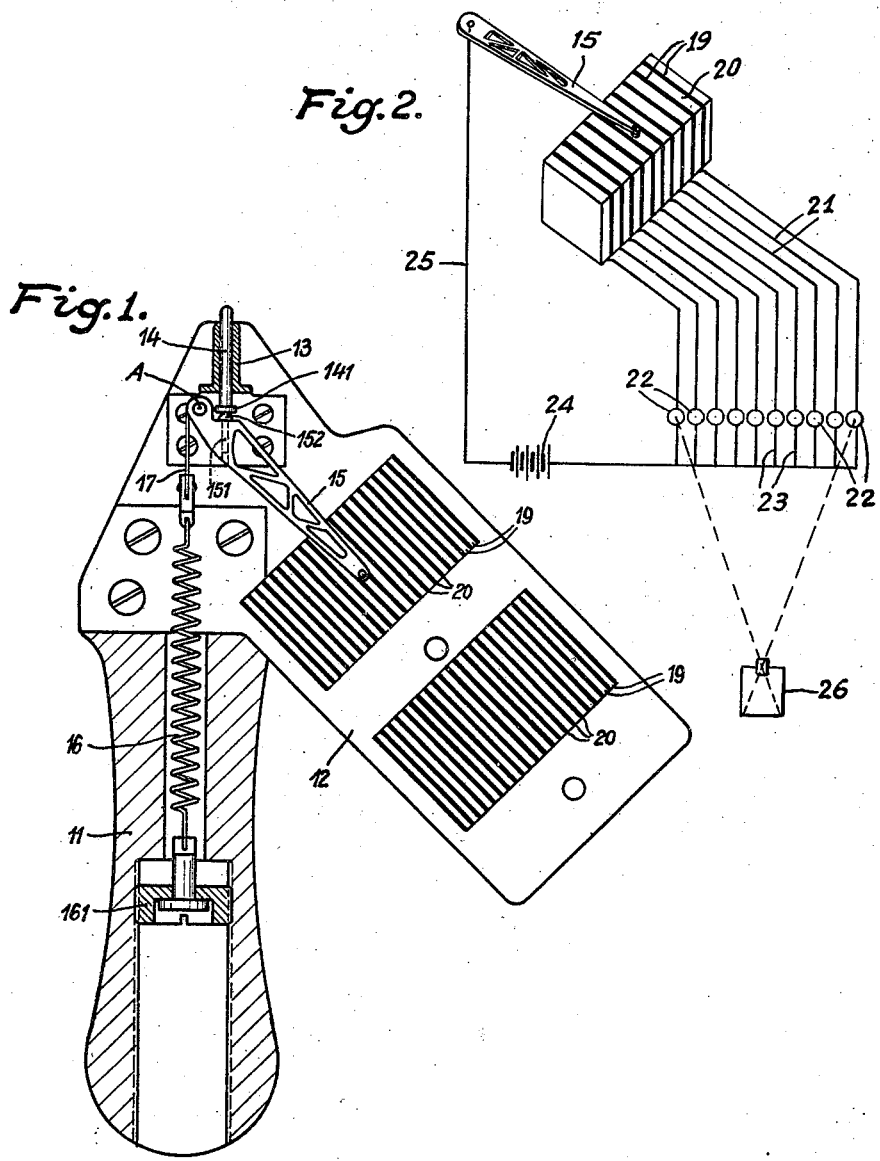
Inventor:
Friedrich Allendorff
by Roy F. Steward
his attorney Patented July 8, 1941

2,248,653

UNITED STATES PATENT OFFICE 2,248,653

APPARATUS FOR MEASURING THE AMPLITUDE OF OSCILLATIONS

Friedrich Allendorff, Stuttgart, Germany, assignor to Robert Bosch Gesellschaft mit beschrankter Haftung, Stuttgart, Germany Application January 27, 1939, Serial No. 253,200
In Germany February 2, 1938

6 Claims. (Cl. 73—51)

The invention relates to an apparatus for measuring the amplitude of oscillations of an oscillating body wherein a push rod is guided in a handle of large mass so as to contact with a vibrating test piece, the to and fro longitudinal movements of the rod being transmitted to an indicating element mounted on the handle and which is drawn into the initial position by a resilient load or other source of stored energy.

Apparatus of this kind is known in which the deflection of the indicator is transmitted to a registering mechanism assembled with the instrument where the registering base (paper roll or the like) is thus installed on the handle. Such an arrangement necessitates a construction which makes it difficult, if not impossible, to test many objects because, due to space limitations, the extensive instrument cannot be brought up to the point to be contacted. In addition, with these registering elements it is not possible during measuring to have a comprehensive view of the magnitude of deflection.

An object of this invention is to provide an apparatus which is more convenient to use, and in which a smaller bulk has to be brought into proximity to the test piece.

The invention starts from recognition of the fact that the registering or recording mechanism and the contact instrument must be separated from each other in order to eliminate the said faults.

According to this invention in an apparatus for measuring the amplitude of oscillations of a test piece wherein a push-rod guided in a handle of large mass abuts an indicator which is pivotally mounted on said handle and urged toward an initial position by a source of stored energy, the arrangement whereby said indicator makes contact with the edges of electrically conductive foils alternately combined with insulating layers to form a pack mounted in said handle, which foils together with said indicator, are in electrical connection with a remotely disposed time-dependent recording means.

One example of a construction embodying the invention is shown in the drawings, in which:

Fig. 1 shows in longitudinal cross-section the instrument adapted to be brought into contact with the oscillating body to be tested, and Fig. 2 shows diagrammatically the recording means and its electrical connections.

A mounting element 12 is so fitted to a heavy handle 11 which is to be gripped by one hand that the element and the handle form an acute angle. On this mounting element is secured a bush 13 in which a push-rod 14 is disposed so as to be longitudinally displaceable.

In order to measure the oscillations, this push-rod 14 is pressed with its rounded point against the element to be tested. It then bears with its other plate-like end 141, which has a level bearing surface, against an arched head 152 of a bolt 151 of steel or the like, which in turn is placed in an indicator 15 formed as a lattice work of light alloy. This indicator is disposed so as to be rockable about the point A as a single armed lever, the free or swinging end thereof indicating, and magnifying, the movements of the push-rod. The bolt 151 is thus fitted in the indicator 15 in the neighbourhood of the pivotal point A. A traction band 17 is secured to indicator 15 and is connected with a helical spring 16. This spring is guided in a central bore of the handle 11 and can be set to the desired preliminary tension by a screw 161. The spring pulls the indicator 15 towards the push-rod 14 and presses the latter into its initial position.

Now if the push-rod 14 is pressed with its rounded end against the oscillating body to be examined, then the rod 14 adjusts the head 152 and the hand or indicator 15, whereby the force of the spring 16 has to be overcome. As a result of the large mass of the handle 11 the oscillations cannot be transmitted to said handle so that the oscillations of the indicating element or indicator 15 give a true measure of the oscillations of the test piece. Measurement of the amplitude of the oscillations of the indicating element may, for instance, be effected by reading off the amplitude of said oscillations on a measuring scale placed underneath or by fitting on the indicating element a light paper with black points drawn thereon which, on a transverse oscillation, appear shortened in a degree proportioned to the oscillation of the indicating element as a result of the high frequency of oscillation. This shortening can be read off immediately on special measuring lines extending in the direction of oscillation.

For registering the amplitude of oscillations, especially in dependence on time, in the example illustrated a foil pack is fitted to that part of the mounting element 12 which is located under the end of the indicating element. This foil pack is formed of layers of waxed foil 19 of electrically conductive material (e. g. brass), and of layers 20 of insulating material (e. g. pressed material or synthetic resin). Through suitable current connections (see Fig. 2) the indicating element or indicator on the one hand and each one of the electrically conductive foils 19 on the other hand are in connection with the electric registering or recording instrument whereby, when certain foils are contacted or touched by a contact carried by the free or swinging end of the indicator as it oscillates, electrical circuits through those particular foils are completed to operate the registering or recording instrument and cause it to register or record the oscillations of said indicator and of the test piece.

As shown diagrammatically in Fig. 2, the pivoted indicator 15 is arranged so that its free or swinging end engages the foil pack 19, 20. The conducting foils 19 are each connected by a conductor 21 with one of a series of lamps 22. The lamps are connected by conductors 23 to one pole of a battery or other source of current 24, the other pole of the battery being connected by conductor 25 to the indicator 15. When one of the foils 19 is contacted by the indicator 15, the circuit of the lamp connected to said foil is completed and said lamp is lighted or glows. A film camera 26 registers or records this glowing of the different lamps on its constantly running film in a series of parallel lines of varying length, the path of these lines providing a curve which, in connection with a time mark on the film, makes it possible to read the amplitude, frequency and character of the oscillations or vibrations of the body being tested.

Apart from the foil pack already mentioned, there is provided on the mounting element 12 a second foil pack which is remote from the pivotal point of the indicating element than the one first mentioned. This foil pack co-operates with a longer indicating element which is to be exchanged for the indicating element 15 illustrated, and indicated the deflections in correspondingly enlarged scale. On transmission of the longitudinal movement of the feeler bar or push rod 14 to the indicating element 15 the smooth surface of the end 141 of the bar contacts with or rolls on the arched head 152 of the bolt 151. During this movement, the spacing of the point of contact between the head 152 and the end 141 from the pivotal point of the indicating element alters to a small degree and could give rise to distortions, not very large in themselves, in registration. This distortion is, however, balanced again because the foils run parallel to each other and to that position of the indicating element in which the spacing of the point of contact between the arched head 152 and the end 141 of the rod from the pivotal point of the indicating element is smallest. With increasing spacing of the indicating element from its inoperative position, its path over a foil takes an increasingly oblique course relative to the bounding surface of the foil and the period of contact therefore becomes continually longer with increasing oscillation.

I declare that what I claim is:

1. Apparatus for measuring the amplitude of oscillations of a test piece, comprising the combination with a handle of large mass, a push-rod movably guided therein, an indicator pivotally mounted on said handle and operatively connected to said push-rod and resilient means for urging said push-rod towards an initial position, of a pack attached to said handle comprising a plurality of alternately disposed insulating layers and electrically conductive foils, and a remotely disposed time-dependent recording means in electrical connection with said conductive foils and said indicator, whence by said indicator sliding over and contacting the foils the aforesaid recording means is correspondingly affected.

2. Apparatus for measuring the amplitude of oscillations of a test piece comprising the combination with a handle of large mass, a spring-loaded and longitudinally movable push-rod guided therein, and an indicator pivotally mounted on said handle and operatively connected to said push-rod, of a removable pack attached to said handle comprising a plurality of alternately disposed insulating layers and electrically conductive foils, and a remotely disposed time-dependent recording means in electrical connection with said conductive foils and said indicator, whence by said indicator sliding over and contacting the foils, the aforesaid recording means is correspondingly affected.

3. Apparatus for measuring the amplitude of oscillations of a test piece comprising the combination with a handle of large mass, a push-rod movably guided therein, a removable indicator pivotally mounted on said handle and operatively connected to said push-rod and spring means for urging said push-rod towards an initial position, said handle being formed to receive removable foil packs at different points, of at least one removable foil pack attached to said handle and comprising a plurality of alternately disposed insulating layers and electrically conductive foils, and a remotely disposed time dependent recording means in electrical connection with said conductive foils and with said indicator, whence by said indicator sliding over and contacting said foils the aforesaid recording means is correspondingly affected.

4. An apparatus according to claim 1 in which in the central position of the indicator the foils lie parallel to a line joining the pivot of said indicator and its contact with the foils.

5. In apparatus for measuring the amplitude of oscillations of a test piece, a portable contactor device comprising a supporting member, a contact member movably supported thereby and adapted to be placed in contact with and be oscillated by said test piece, an oscillatable indicator actuated by said movable member, a contact carried by said oscillatable indicator, a plurality of contacts carried by said supporting member and adapted to be contacted by said indicator contact, and electrical recording means in electrical connection with said contacts whereby when said indicator contact contacts the other contacts said recording means will be actuated to indicate the oscillations of said test piece.

6. Apparatus for measuring the amplitude of oscillations of a test piece comprising a supporting member, a member slidably supported thereby and adapted to contact and be oscillated by said test piece, resilient means for urging said movable member to an initial position, a pivoted indicator actuated by said movable member, a contact carried by said pivoted indicator, a plurality of contacts carried by said supporting member and adapted to be contacted by said indicator contact, and remotely disposed electrical recording means in electrical connection with said contacts whereby oscillation of said indicator will cause the contact carried thereby to contact the other contacts and actuate said recording means to indicate the oscillations of said test piece.

FRIEDRICH ALLENDORFF.